Inventors
GEOFFREY J. LEIGHTON
RONALD F. MASKELL
NORMAN Z. ALCOCK

April 13, 1954
G. J. LEIGHTON ET AL
2,675,483
METHOD AND APPARATUS FOR MEASURING THE
MASS PER UNIT AREA OF SHEET MATERIAL
Filed March 25, 1952
2 Sheets-Sheet 2
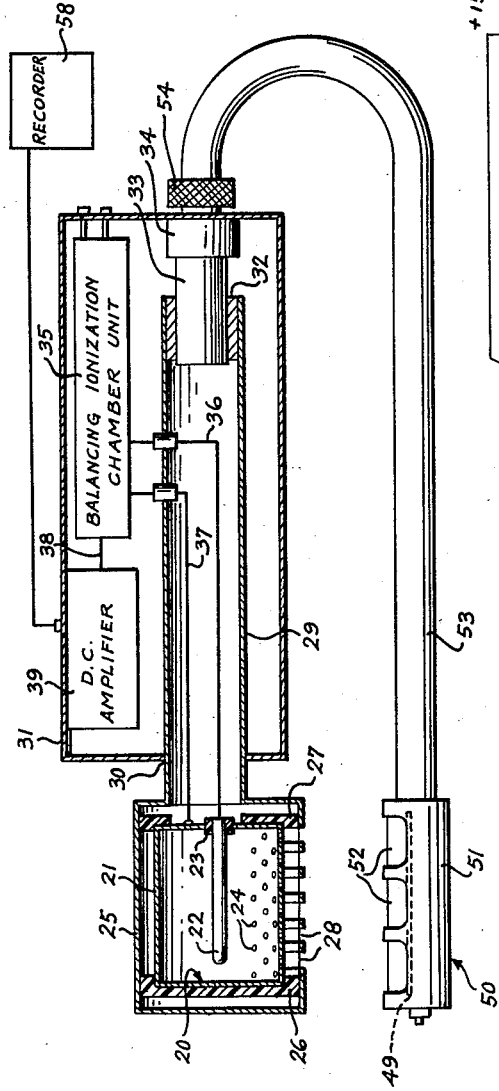
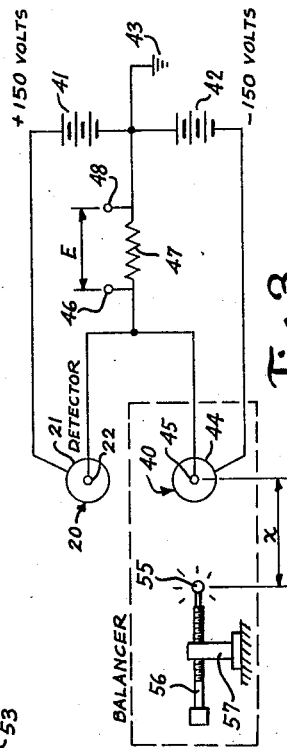
Inventors
GEOFFREY J. LEIGHTON
RONALD F. MASKELL
NORMAN Z. ALCOCK
by: Fetherstonhaugh & Co.
Atty's.

Patented Apr. 13, 1954

2,675,483

UNITED STATES PATENT OFFICE 2,675,483

METHOD AND APPARATUS FOR MEASURING THE MASS PER UNIT AREA OF SHEET MATERIAL

Geoffrey J. Leighton, Ronald F. Maskell, and Norman Z. Alcock, Oakville, Ontario, Canada, assignors to Isotope Products Limited, Oakville, Ontario, Canada, a company of Ontario Application March 25, 1952, Serial No. 278,472

9 Claims. (Cl. 250—83.6)

1

This invention relates to improvements in methods and apparatus for measuring the mass per unit area and hence the thickness of homogeneous sheet materials.

Heretofore, attempts have been made to measure the thickness of sheet material such as paper by radiation techniques employing a collimated source disposed on one side of the sheet directed to emit radiation energy to the sheet, the non-absorbed radiation of which passes through the sheet to activate an ionization chamber disposed on the other side of the sheet. In prior apparatus of this class, the ionization chamber has been positioned with the axis of the collector electrode disposed at substantially right angles to the sheet of material being inspected. It is well known that this prior arrangement is critical to the placement of the sheet material between the source and the detector or ionization chamber, in that slight movement of the sheet toward or away from the source materially affects the amount of radiation received by the detector. Prior scintillation detectors by reason of a single plane detecting surface, are similarly affected.

It is a particular object of the invention to provide a method and apparatus for measuring the mass per unit area of sheet material by a radiation technique wherein the sheet may range in its position between the radiation energy source and the detector without substantially affecting the amount of radiation energy received by the detector.

It is another object of the invention to provide an improved method and apparatus for measuring the mass per unit area and hence the thickness of sheet material by a radiation transmission technique wherein the source and the detector are substantially devoid of collimation and wherein the angle of vision of the detector is less than 180° but greater than the angle of emission of the radiation energy source.

Other objects of the invention will be appreciated by a study of the following specification taken in conjunction with the accompanying drawings, wherein:

Figure 2 is a sectional elevation of one form of suitable apparatus according to the invention; and Figure 3 is a general schematic of an ionization chamber differential balancing system employed in apparatus of the invention.

Figure 1:
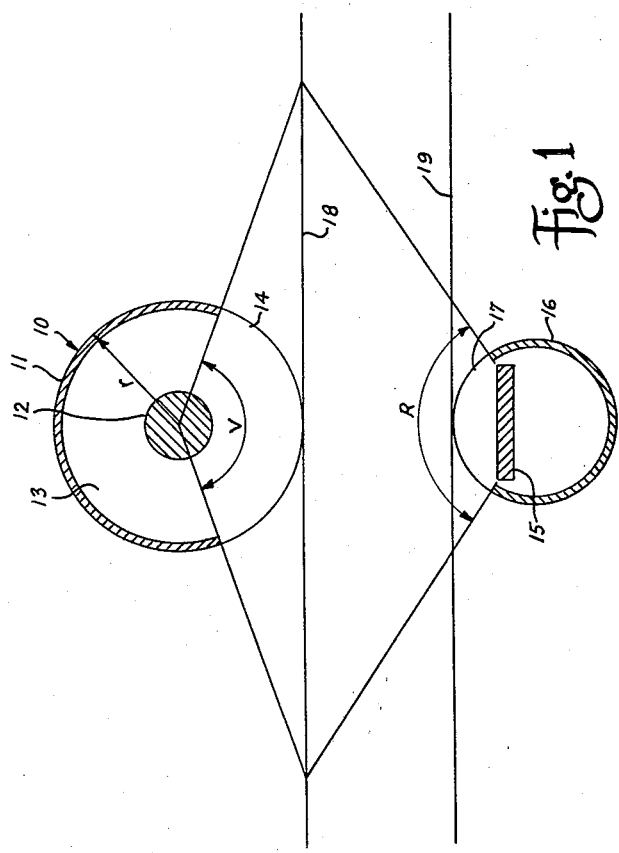
Figure 1 is a diagrammatic illustration of a mass per unit area measuring device according to the invention.

In the preferred form of apparatus according

2 to the invention, an ionization chamber is employed as a detector, but this chamber is of different design than that heretofore used, in that it is of transversely activated form. Thus, in Figure 1, a detector 10 such as an ionization chamber of the type contemplated and preferred for use in the method and apparatus of the invention comprises a cylindrical outer electrode wall 11 spaced from an inner electrode or collector 12 containing in the tubular space 13 a gas under pressure adapted to be ionized by radiation bombardment to cause a current to flow between the electrodes. The electrodes are maintained at a desired difference of electrical potential in a manner well known. In accordance with the invention, the cylindrical wall electrode 11 carries a plurality of openings 14 therein effectively providing a predetermined aperture angle V, hereinafter referred to as an angle of acceptance.

Preferably, a beta emitting source material 15, such as Thalium 204, of 800 kilovolts and 20 millicuries, of a strip form about one inch width by fourteen inches long, is supported within a housing 16 in such manner that the emission therefrom is substantially unrestricted. A plurality of slots 17 are provided in the housing 16 substantially corresponding in arrangement to the apertures 14 of the electrode 11 of the ionization chamber of the detector 10. The slots 17 of the housing 16, provide an effective aperture of a radial extent at least permitting full development of the angle of useful emission R of the source material 15.

In accordance with well known practice, the detector is positioned in spaced apart relation to the source 15 a distance determined by the area of the effective aperture of the detector, the number of millicuries of radiation energy source strength, the percentage statistical error to be accepted in the measurement of thickness of material, the time constant of the measuring system, and the efficiency of the detector itself.

In examining Figure 1, it will be apparent that if a sheet of material 18 is placed as close to the detector as possible, the angle V is sufficient to ensure the acceptance of deflected radiation from the outer fringes of the emission pattern developed on the sheet by emission from the source 15. In all cases, however, the angle V will be less than 180°.

When a sheet of material is in the position of the sheet 19, the wide angle of vision V of the detector established in the manner just described, still affords acceptance of all of the radiation energy transmitted and deflected through the sheet 19 toward the detector. Accordingly, the positioning of any sheet of material to be examined may range between the positions shown by the sheets 18 and 19 without materially affecting the total amount of radiation received by the detector. Moreover, the sheet need not pass between the source and the detector precisely at right angles to a line joining the axis of the source and the axis of the detector, small angles of tilt up to 6° having a negligible effect for most applications and equipment designs.

It should be appreciated that the effective apertures of scintillation and ionization chamber detectors of the prior art are of very limited nature as compared with the concept of a wide angle aperture according to the invention. Detector apertures of the prior art may be represented substantially by a plane surface limited by reason of the plane characteristic substantially of the acceptance of collimated radiation. Such has been the prior use of scintillation detectors and the effective result obtained in the prior use of ionization chambers wherein the collector thereof has had its axis disposed substantially at right angles to the sheet material being examined.

As compared with such prior limited apertures, the detector aperture of the invention contemplates utilization of more than one plane surface of the crystal of a scintillation detector; for example, one plane face continuing in its marginal edges to four side planes at right angles thereto and which are adapted to accept radiation leaving a sheet at a small angle of emergence with more efficiency of detection than the main plane surface of the crystal disposed parallel to the sheet and which is thus positioned to accept such low angle radiation with a small efficiency of detection. Also, the so-called transversely activated form ionization chamber herein contemplated has a similar wide angle of vision or acceptance for radiation leaving the sheet material being examined, and in this respect, differs from the capabilities of the more conventional disposition of an ionization chamber with the collector perpendicular to a sheet.

One preferred form of apparatus particularly adapted to the measuring of the mass per unit area and if desired the thickness of lightweight paper sheet, and the like, is illustrated in Figure 2. A transversely activated type of ionization chamber 20 according to the invention, comprises a cylindrical outer electrode 21 in form of a cylindrical wall supporting therewithin an inner collector electrode 22 insulated therefrom by suitable insulation 23. A plurality of openings 24 are arranged in the cylindrical wall of the outer electrode to define an effective aperture of wide angle extending substantially the full length of the ionization chamber. The openings 24 may be covered with a radiation transparent window material such as glass and the chamber sealed to maintain the usual ionizable gas under pressure therewithin. An outer housing 25 supports the ionization chamber 20 by means of insulating blocks 26 and 27, the housing 25 having a plurality of apertures 28 therein of a radial extent conforming to the effective aperture angle developed by the openings 24. A tubular support arm 29 extends from the housing 25 through an opening 30 in the amplifier case 31 for engagement by the sleeve 32 on the free end thereof over the post 33 of the fitting 34, the latter also being supported by the amplifier housing 31. The amplifier housing 31 contains therewithin a balancing ionization chamber unit 35 connected by leads 36 and 37 passing into the arm 29 for connection to the electrode 21 and collector 22 of the ionization chamber 20. The balancing ionization chamber unit is connected by a suitable cable 38 to a direct current amplifier 39 of a design and construction known to skilled persons.

As illustrated in Figure 3, the balancing ionization chamber unit is employed for accomplishing a differential reading of the energy detected by the detector 21 referred to a standard energy source. Thus, the detector ionization chamber 20 may be connected in bucking relationship with a second similar ionization chamber 40, wherein the sources 41 and 42 of operating voltage may be commonly connected in opposed relationship to ground as at 43 and to the electrodes 21 and 44 of the ionization chambers. The inner electrodes 22 and 45 are commonly connected to an output terminal 46, the latter connecting through a high resistance 47 to a ground terminal 48 as indicated.

The detector 20 is energized by energy from a source 49 as shown in chain lines in Figure 2, and disposed within the source head 50 defined by the cylindrical housing 51 apertured as at 52 and supported by the U-shaped arms 53 having a mounting plug thereon (not shown) adapted to be received and locked within the fitting 34 by the screw-type bushing 54.

As illustrated in Figure 3, the balancing ionization chamber 40 is energized by a source 55 physically adjustable in its activating distance $x$ from the chamber 40 by means of a supporting screw 56 in a fixed bracket 57.

In operation, therefore, the two ionization chambers 20 and 40 may be balanced to develop a zero direct current potential across the high value resistor 47 by adjusting the position of the source 55 relative to the chamber 40. This balancing operation may be effected without any sheet obstructing passage of emission from the source 49 to the detector head 20 so that any very small absorption of such energy by any interfering body or gas will cause a voltage to be developed across the resistor 47. In measuring the thickness of sheet material of uniform density, it is first desirable to adjust the source 55 to balance the system for an average thickness indication. The voltage developed across the resistor 47 is amplified by the direct current amplifier 39 to which may be connected a pen recorder 58 of well known construction, or a suitable voltmeter. Accordingly, a reading will be obtained which will fluctuate above and below the average value established by this balancing operation, in accordance with an increase or decrease in thickness of the sheet from the average value at which the adjustment was made. In this manner, very slight differences in thickness can be detected.

The device disclosed may be employed for continuously measuring and recording the mass per unit area and, hence, the thickness of a homogeneous material passed between the source and the detector without any physical contact with the material and may also be used for continuously measuring and recording the amount of wax, carbon, ink, dye, plastic, or other coating or impregnant material adhered to a sheet. The source of radiation may be a beta ray emitter or a gamma ray emitter of convenient half life. By employing a balancing device of the same character as the detector and source, the decay of the radioactive source is counteracted. For thick sheet materials, a beta ray emitter is employed as a source material. For very thick materials, it may be necessary to use a gamma emitter as a source, but in this case the source of the balancer may still employ a beta emitter as an internal standard in association with the second detector.

The first detector or measuring head may be of a length corresponding to the length of the source adapted to cover the entire width of a sheet, the mass per unit area of which is being measured. If desired, the source may be restricted in length and a lateral traverse of the detecting head and source be made over the sheet. In this way, the action of squeeze rolls in the manufacture of sheet material in rubber mills and plastic mills can be detected in the control of thickness across the sheet. Obviously, a spot type of source may be used for relatively localized inspection purposes and with the same detector head. Although an ionization chamber form of detector is preferred as disclosed, in many cases a scintillation detector of lesser sensitivity will be found satisfactory, for example in measurements where the distance between the source and detector need not be large.

It is intended that the present disclosure should not be construed in any limiting sense other than that indicated by the scope of the following claims.

What we claim as our invention is:

1. Apparatus for measuring the mass per unit area of sheet material, comprising in combination: a source of radiation energy; a radiation detecting device in the form of an ionization chamber comprising an inner and an outer electrode disposed in annular spaced apart relation, the outer electrode being in the form of a tube; openings in said tube at substantially right angles to the longitudinal axis thereof arranged to effectively define an aperture for said detector, the effective angle of acceptance of which is less than 180° but greater than the angle of emission of radiation from said source; and means supporting said radiation detecting device in predetermined spaced apart relation from said source.

2. Apparatus as claimed in claim 1; a second detecting device and a second source of radiation energy adjustable in its position relative thereto; an electrical current source for each of said detecting devices; means electrically connecting said detecting devices and their current sources electrically in opposition, whereby electrical current flow in one detecting device may be balanced with the electrical current flow in the other detecting device by adjustment of the second source; and means for detecting the magnitude of an unbalanced current condition between said detecting devices after adjustment of said second source to indicate a change in mass per unit area between said first source and said first detecting device by placement of a substance therebetween.

3. Apparatus as claimed in claim 1; a second detecting device and a second source of radiation energy adjustable in its position relative thereto; an electrical current source for each of said detecting devices; means electrically connecting said detecting devices and their current sources electrically in opposition, whereby electrical current flow in one detecting device may be balanced with the electrical current flow in the other detecting device by adjustment of the second source; means for detecting the magnitude of an unbalanced current condition between said detecting devices after adjustment of said second source to indicate a change in mass per unit area between said first source and said first detecting device by placement of a substance therebetween; and means associated with said unbalanced current condition detecting means for continuously recording said condition.

4. Apparatus for measuring the mass per unit area of sheet material by the radiation transmission method, comprising in combination: a source of radiation energy; an enclosure for said source having a substantially non-confining opening allowing substantially unconfined emission from said source at a large angle but less than 180°; an ionization chamber having an inner centrally disposed collector electrode supported within and annularly spaced from a tubular outer electrode, but co-axial therewith; and an aperture in said outer electrode positioned to allow radiation to pass into said chamber in a direction substantially at right angles to the common axis of the inner and outer electrodes and of an effective angle of acceptance for said radiation energy of a value less than 180° but greater than the angle of emission from said source.

5. Apparatus for measuring the mass per unit area of sheet material by the radiation transmission method, comprising in combination: a source of radiation energy; an enclosure for said source having a substantially non-confining opening allowing substantially unconfined emission from said source at a large angle but less than 180°; an ionization chamber having an inner centrally disposed collector electrode supported within and annularly spaced from a tubular outer electrode but co-axial therewith; an aperture in said outer electrode positioned to allow radiation to pass into said chamber in a direction substantially at right angles to the common axis of the inner and outer electrodes and of an effective angle of acceptance for said radiation energy of a value less than 180° but greater than the angle of emission from said source; a second ionization chamber and an independent source of radiation energy associated therewith; means for adjusting the position of said independent source of radiation relative to said second ionization chamber; an independent voltage source for each of said ionization chambers; and means for measuring the difference in the electrical current flowing through each of said chambers.

6. Apparatus for measuring the mass per unit area of sheet material by the radiation transmission method, comprising in combination: a source of radiation energy; an enclosure for said source having a substantially non-confining opening allowing substantially unconfined emission from said source at a large angle but less than 180°; an ionization chamber having an inner centrally disposed collector electrode supported within and annularly spaced from a tubular outer electrode but co-axial therewith; an aperture in said outer electrode positioned to allow radiation to pass into said chamber in a direction substantially at right angles to the common axis of the inner and outer electrodes and of an effective angle of acceptance for said radiation energy of a value less than 180° but greater than the angle of emission from said source; a second ionization chamber and an independent source of radiation energy associated therewith; means for adjusting the position of said independent source of radiation relative to said second ionization chamber; an independent voltage source for each of said ionization chambers; means for measuring the difference in the electrical current flowing through each of said chambers; a housing supporting said second ionization chamber and associated source therewithin; means removably supporting said first mentioned ionization chamber in fixed relation to said housing; and a U-shaped member extending from said housing and supporting on its free end said first mentioned source in predetermined spaced apart relation from said first mentioned ionization chamber.

7. Apparatus for measuring the mass per unit area of sheet material by the radiation transmission method, comprising in combination: a source of radiation energy; an enclosure for said source having a substantially non-confining opening allowing substantially unconfined emission from said source at a large angle but less than 180°; an ionization chamber having an inner centrally disposed collector electrode supported within and annularly spaced from a tubular outer electrode but co-axial therewith; an aperture in said outer electrode positioned to allow radiation to pass into said chamber in a direction substantially at right angles to the common axis of the inner and outer electrodes and of an effective angle of acceptance for said radiation energy of a value less than 180° but greater than the angle of emission from said source; a second ionization chamber and an independent source of radiation energy associated therewith; means for adjusting the position of said independent source of radiation relative to said second ionization chamber; an independent voltage source for each of said ionization chambers; means for measuring the difference in the electrical current flowing through each of said chambers; and means for indicating the said differential current, including means for continuously recording said indication.

8. Apparatus for measuring the mass per unit area of sheet material by the radiation transmission method, comprising in combination: a source of radiation energy; an enclosure for said source having a substantially non-confining opening allowing substantially unconfined emission from said source at a large angle but less than 180°; an ionization chamber having an inner centrally disposed collector electrode supported within and annularly spaced from a tubular outer electrode but co-axial therewith; an aperture in said outer electrode positioned to allow radiation to pass into said chamber in a direction substantially at right angles to the common axis of the inner and outer electrodes and of an effective angle of acceptance for said radiation energy of a value less than 180° but greater than the angle of emission from said source; a second ionization chamber and an independent source of radiation energy associated therewith; means for adjusting the position of said independent source of radiation relative to said second ionization chamber; an independent voltage source for each of said ionization chambers; means for measuring the difference in the electrical current flowing through each of said chambers; a housing supporting said second ionization chamber and associated source therewithin; means removably supporting said first mentioned ionization chamber in fixed relation to said housing; a U-shaped member extending from said housing and supporting on its free end said first mentioned source in predetermined spaced apart relation from said first mentioned ionization chamber; and means for indicating the said differential current, including means for continuously recording said indication.

9. A method of measuring the mass per unit area of a sheet of material, comprising the steps in combination of: irradiating one side of the sheet with a source having a wide angle of emission; and arranging a detector in predetermined spaced apart relation to said source but on the other side of said sheet, to accept resulting radiation from the other side of the sheet within an angle of acceptance less than 180° but greater than the angle of emission from said source.

References Cited in the file of this patent

UNITED STATES PATENTS

| Number | Name | Date |
|---|---|---|
| 2,465,821 | Smoluchowski | Mar. 29, 1939 |
| 2,486,902 | Wolf | Nov. 1, 1949 |
| 2,546,984 | Deloraine et al. | Apr. 3, 1951 |
| 2,586,303 | Clarke | Feb. 19, 1952 |